March 26, 1935.  L. DARIMONT  1,995,964
SCREEN FOR CINEMATOGRAPHIC PROJECTIONS AND THE LIKE
Filed Oct. 11, 1934
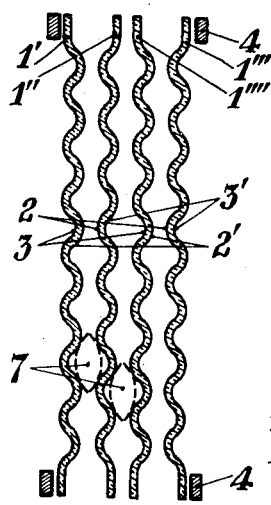
Fig.1
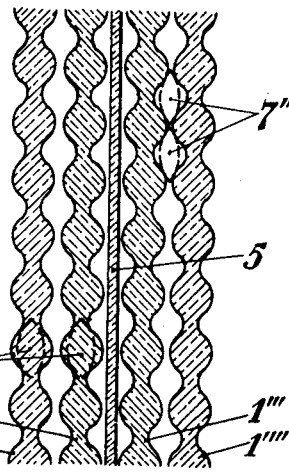
Fig.2
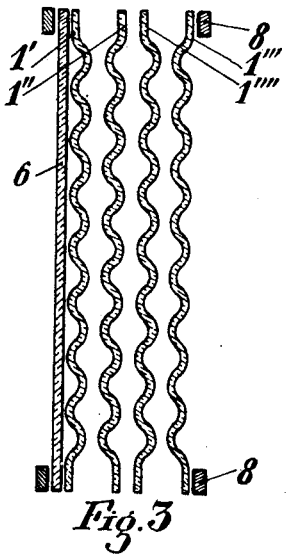
Fig.3
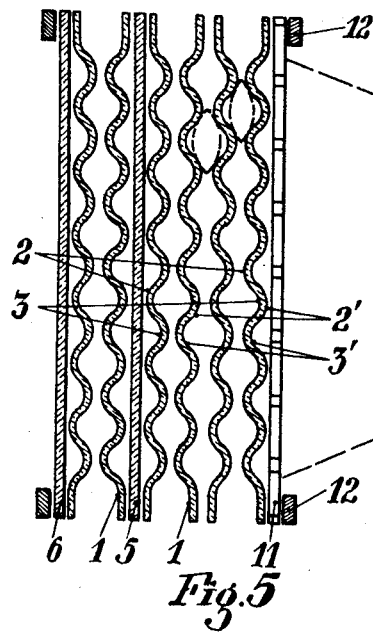
Fig.5
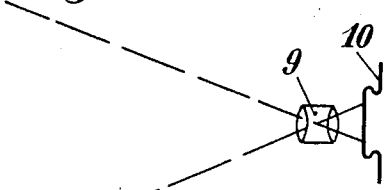
Fig.4
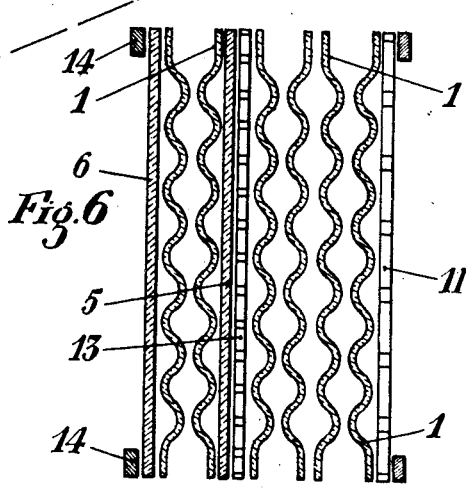
Fig.6
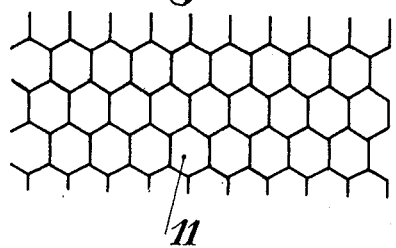
Inventor:
Leopold Darimont
BY [signature]
Attorney Patented Mar. 26, 1935

1,995,964

UNITED STATES PATENT OFFICE 1,995,964

SCREENS FOR CINEMATOGRAPHIC PROJECTIONS AND THE LIKE

Leopold Darimont, Brussels, Belgium

Application October 11, 1934, Serial No. 747,966
In Germany October 16, 1933

12 Claims. (Cl. 88—24)

This invention relates to the screen used for cinematographic and other projections, and its object is to realize a screen which, whilst giving pictures which are luminous and of considerable depth, with strongly contrasted lights and shades, also give an exact and perfect impression of relief.

Screens are already known consisting of translucent superposed layers, which produce a succession of diffusions. Screens are also known, consisting of flat sheets of transparent matter assembled together, in the thickness of which the image is projected.

Further, in cinematographic projection screens, in order to obtain extremely favourable effects in daylight projection, it has been proposed to form concavities on one side, corresponding to concavities on the other side of a single sheet of transparent matter which constitutes the screen.

In other screens there is a combination of a mirror with a transparent sheet embossed on one side, the interval between the mirror and the sheet being at least six millimetres. In this system the use of a sheet embossed on both sides is relinquished.

Complex screens have also been proposed, consisting of two reticular surfaces with silvered meshes, stretched in front of and parallel to an opaque silvered surface, their various surfaces being superposed so as to leave between each of them a uniform thickness of air, from which result successive images of differing dimensions compared with each other, formed by reflection and seen successively.

This invention relates to a screen formed of several transparent superposed sheets, having been treated to form on both sides of each sheet an infinity of bosses in relief and depressed, spherical in shape and very close together; the convex and concave bosses of two neighbouring sheets are combined so as to form between two sheets, the same number of lenticular spaces which constitute an infinity of points of concentration for light, especially in the high lights of the picture, to give thus greater luminosity to the whole picture, with an impression of relief.

In such screens, there is formed by the passing of the rays of light between the different sheets, with regard to the thin layer of air of irregular thickness imprisoned between each pair of successive sheets, a multitude of small zones of refraction and diffraction which produce in the picture obtained an iridescence at an infinity of points on the surface of each sheet, as well as a succession of very slight diffusions of the whole image. The picture thus obtained is particularly luminous, of a very warm tone, considerable depth, and with strongly contrasted lights and shades, the effects of which are cumulative in producing the impression of relief on the front or on the back of the screen.

It is evident that the concentration of light produced by said lenses in each point of the picture, is done at the cost of the luminosity of a small circular zone surrounding the point of concentration, because the total amount of light transmitted to the picture remains constant: nevertheless the greater luminosity in an infinity of points uniformly distributed on the surface of the picture, especially in the lighter parts, gives the observer an impression of greater total luminosity.

This invention proposes also to introduce a thin sheet of brilliant transparent matter between the embossed sheets, to produce an increase of luminosity in the background of the picture, owing to the fractionated reflection of the luminous picture which occurs on the surface of said brilliant sheet; further by adding a smooth brilliant sheet, of transparent material, or made opaque, as back surface of the screen, which reflects the picture in the opposite direction through said embossed sheets, a more luminous picture is obtained, especially in the background of the picture and also greater distinctness. For the same amount of relief effect, if said back sheet is opaque, about half as many embossed sheets are required.

By the use of such a screen, very luminous pictures are obtained, which already give the impression of relief, but in which the pictures have lost a little of their sharpness, further this screen becomes rather dazzling during the projection. The parts of the phototype which are too feebly contrasted are more or less drowned, the details are not very evident, and these parts of the picture are not reproduced in all their plastic fullness, and with all the relief which might be obtained.

In order to complete this screen so that the picture is sharp and very luminous, visible in all its shades and in all its details, with an enormous increase of the stereoscopic effect desired, there is added to said screen a network, for instance in cotton tulle, placed against the side of the screen which receives the luminous picture. The picture formed on a screen thus completed consists of two parts: one part reflected by the surface of the network and giving a picture which is quite sharp in all its parts, but relatively less luminous, and another part, formed in the thickness of the screen by successive diffusions, this part of the picture being very luminous, but relatively not so sharp.

These two parts of the picture, of different aspect between themselves, are however complementary of each other, and their combination gives a complete picture, very luminous, and very sharp, with a greatly increased stereoscopic effect, whereas the dazzling effect of the screen is totally suppressed. The picture is looked at from the side of the screen having the network.

Two or several network sheets may also be used, the second or third sheet etc. of tulle being placed between the transparent embossed sheets, for instance in proportion of one sheet of tulle per two embossed sheets, and preferably these different sheets of tulle will have a mesh more and more close, so that a tulle of large mesh is always placed in front of tulle of finer mesh. The sharp pictures formed on the tulle cover each other and combine with the picture formed by the embossed sheets. The resulting picture should be looked at from the side of the first sheet of tulle, the side from which the picture is projected. By this combination the absolutely new result is obtained of making the surface of the screen quite imperceptible during the projection: the screen disappears completely and the impression of a space is given in which the projected pictures move, which produces an intensified stereoscopic and natural impression of the pictures thrown on the screen thus completed.

The invention is described more in detail when refering to the annexed drawing, which are given as an example of a nonlimited embodiment and in which:

Fig. 1 is a more or less schematic section of the screen in a first form of embodiment, consisting of embossed sheets only.

Fig. 2 is a schematic section of a different embodiment, including a flat sheet placed between the embossed sheets.

Fig. 3 is a schematic section of a second variety, consisting of a flat sheet which forms the back of the screen.

Fig. 4 is a section of a screen completed by a network on the front of the screen.

Fig. 5 is a front view of a network and

Fig. 6 is a section of a second kind of screen, including a network inserted betwen the embossed sheets.

The screen according to Fig. 1 is made of several thin sheets superposed, of uniform thickness and in transparent material capable of being treated as desired, for instance in cellulose acetate, 1′, 1″, 1‴, 1⁗, etc. Each of these sheets has been treated, such as embossing so as to produce on each side an infinity of small bosses 2 and small receses 3 in uninterrupted succession; each of these bosses 2 or recesses 3, corresponds exactly to a recess 3′, or a boss 2′ of the opposite side of the same sheet respectively, and these sheets are mounted together and fixed in a frame 4 so that in this case, the bosses 2, 2′ and the recesses 3, 3′ of any two sides in question are opposite each other. The shape of the bosses and of the receses is theoretically hemispherical, but possibly in practice of a shape which approaches more or less exactly to said spherical shape. Between each pair of sheets there is a thin layer of air consisting of successive enlargements 7 shaped like lenses. Each of these lenses 7 causes a concentration of light on one point of the picture, especially in the high lights of the picture.

For a first variety of the embodiment shown in Fig. 2 each sheet is embossed so that the bosses of recesses respectively of one side of each sheet are made so as to correspond to a boss, or recess respectively, of the other side of the same sheet, and the sheets are placed so that the bosses or recesses, respectively of opposite faces correspond. In this case the lenses 7′ are made in the thickness itself of the sheets 1, 1′, etc. whereas the air spaces between two sheets include small spaces of lenticular shape 7″ and produce the required effect. Whether the lenses are formed in the air space reserved between the embossed sheets and/or in the thickness of the sheets, they always constitute a medium in lenticular shape, or approximately lenticular, which has a different index of refraction to the surrounding medium, and produces on the picture a condensation of light at an infinity of separate points, infinitely near together and which also produces diffractions and irradiation, and the picture thus formed has a quite particular aspect, stereoscopic, warm toned, intsead of the dull tone of the usual projections. Further, the picture thus formed, produced by successive diffusions in the whole thickness of the screen, is very soft and may be seen with the same impression of relief from all parts of the hall.

In the embodiment of Fig. 2, there is interposed between the embossed sheets 1″ and 1‴, a sheet 5, thin, shining, of transparent material, for instance in cellulose acetate. One flat sheet 5 may be used per separate pair of embossed sheets 1′, etc. These flat sheets, under these conditions, do not destroy the effect of the embossed sheets, but increase it, at the same time considerably increasing the luminosity, especially in the background of the picture, owing to the fractional reflection of the luminous picture, which takes place on the surface of each shining sheet, towards the embossed sheets which precede it.

As a second variety of the screen, shown in Fig. 3, with embossed sheets in any number 1′, 1″, etc., arranged as in Fig. 1, a thin sheet 6, flat, shining, and in material such as cellulose acetate, made opaque or not, or with a metallized surface, has been placed on the opposite side to that which receives the luminous picture, with or without interposition of flat transparent sheets between the embossed sheets of Fig. 2, the whole is mounted in a holding frame 8. In the case where the sheet 6 is opaque, the picture is only visible on the front of the screen, and this arrangement allows the use of a number of embossed sheets half as large as in the preceding arrangements, to obtain the same effect, because the effect of the embossed sheets is doubled; the light first passes through all the embossed sheets 1′, 1″, etc., to reach the screen 6, and since the picture is seen, for the greater part at least, by reflection from said screen, the light has to repass the embossed sheets in the opposite direction, which results in an increased luminosity, especially in the background of the picture, while the picture thus obtained gains in sharpness.

According to Fig. 4, showing the complete screen, there is added to the front of the screen, i. e. on the side facing the projection apparatus 9, 10, a network 11 in opaque or nearly opaque material, for instance cotton net or tulle. The material which constitutes the net 11 is preferably dead white in colour which gives a good reflecting surface. The network is preferably honeycombed, as shown in Fig. 5.

The whole of the sheets 1, 5, 6 and network 11 is maintained in a frame 12.

It may be arranged to place the network behind the first embossed sheet 1, but a more interesting embodiment consists in leaving a perforated sheet or network 11 on the front side of the screen, and to interpose in the thickness of the screen, a second network 13, as shown in Fig. 6. The meshes of the network 13 are preferably smaller or closer than the meshes of the network 11. Several superposed networks may be arranged, but in general there is one network per group of at least two embossed sheets 1.

The network 13 may be placed before the smooth transparent sheet 5. The network may also be attached to one or several of the sheets 1, 5 or 6. Networks of various colours may be arranged for.

It is evident that the embossed sheets 1, and/or the flat sheets 5 or 6 which constitute the screen may be colourless or coloured in various ways in all possible combinations.

Evidently the air retained between the embossed sheets and other sheets forming the screen, may be replaced by any matter, provided that the degree of refrangibility of the matter retained between said sheets is different to that of the material which forms said sheets.

Having now fully described my said invention, what I claim and desire to secure by Letters Patent, is:

1. A screen for cinematographic projections comprising a plurality of superposed sheets of transparent material, both sides of each sheet having a multitude of bosses and recesses of semi-spherical shape, the bosses and the recesses of each side being combined with the recesses, respectively the bosses of the opposite side of the neighbouring sheet in order to form between the successive sheets a multitude of little spherical lenses.

2. A screen for cinematographic projections, comprising a plurality of superposed sheets of transparent material, both sides of each sheet having a multitude of bosses and recesses of semi-spherical shape, the bosses and recesses of each side being formed from one side to the other of each sheet so that there is formed in the thickness of the transparent sheet a multitude of spherical lenses.

3. A screen for cinematographic projections comprising a plurality of superposed sheets of cellulose acetate, both sides of each sheet having a multitude of bosses and recesses of semi-spherical shape, the bosses and the recesses of each side being combined with the recesses, respectively the bosses of the opposite side of the neighbouring sheet in order to form between the successive sheets a multitude of little spherical lenses.

4. A screen for cinematographic projections comprising a plurality of superposed sheets of cellulose acetate, both sides of each sheet having a multitude of bosses and recesses of semi-spherical shape, the bosses and the recesses of each side being formed from one side to the other of each sheet so that there is formed in the thickness of the transparent sheet a multitude of spherical lenses.

5. A screen for cinematographic projections, comprising a plurality of superposed sheets of cellulose acetate, both sides of each sheet having a multitude of bosses and recesses of semi-spherical shape, the bosses and the recesses of each side being formed from one side to the other of each sheet, and from one side of each sheet to the opposite side of the neighbouring sheet so that there is formed in the thickness itself of the transparent sheets, and in the spaces between the successive sheets, spherical lenses.

6. A screen for cinematographic projections comprising a plurality of superposed sheets of cellulose acetate, both sides of each sheet having a multitude of bosses and recesses of semi-spherical shape, the bosses and the recesses of each side being combined with the recesses, respectively the bosses of the opposite side of the neighbouring sheet in order to form between the successive sheets a multitude of little spherical lenses, thin, shining, flat sheets of transparent material being inserted between certain of the embossed sheets.

7. A screen for cinematographic projections comprising a plurality of superposed sheets of cellulose acetate, both sides of each sheet having a multitude of bosses and recesses of semi-spherical shape, the bosses and the recesses of each side being combined with the recesses, respectively the bosses of the opposite side of the neighbouring sheet in order to form between the successive sheets a multitude of little spherical lenses, thin shining, flat sheets of transparent material being inserted between certain of the embossed sheets, and a thin, shining flat sheet of transparent material being placed on the back of the screen.

8. A screen for cinematographic projections comprising a plurality of superposed sheets of cellulose acetate, both sides of each sheet having a multitude of bosses and recesses of semi-spherical shape, the bosses and the recesses of each side being combined with the recesses, respectively the bosses of the opposite side of the neighbouring sheet in order to form between the successive sheets a multitude of little spherical lenses, thin, shining, flat sheets of transparent material being inserted between certain of the embossed sheets, and a thin, shining flat sheet of nontransparent material being placed on the back of the screen.

9. A screen for cinematographic projections comprising a plurality of superposed sheets of cellulose acetate, both sides of each sheet having a multitude of bosses and recesses of semi-spherical shape, the bosses and the recesses of each side being combined with the recesses, respectively the bosses of the opposite side of the neighbouring sheet in order to form between the successive sheets a multitude of little spherical lenses, thin, shining flat sheets of transparent material being inserted between certain of the embossed sheets, a thin, shining flat sheet being placed on the back of the screen and a net work sheet, with non-shining surface being placed on the side of the screen which receives the luminous pictures.

10. A screen for cinematographic projections comprising a plurality of superposed sheets of cellulose acetate, both sides of each sheet having a multitude of bosses and recesses of semi-spherical shape, the bosses and the recesses of each side being combined with the recesses, respectively the bosses of the opposite side of the neighbouring sheet in order to form between the successive sheets a multitude of little spherical lenses, thin shining flat sheets of transparent material being inserted between certain of the embossed sheets, a thin, shining flat sheet being placed on the back of the screen and a network sheet, with non-shining surface being placed on the side of the screen which receives the luminous pictures, similar network sheets being inserted between certain of the embossed sheets.

11. A screen for cinematographic projections comprising a plurality of superposed sheets of cellulose acetate, both sides of each sheet having a multitude of bosses and recesses of semi-spherical shape, the bosses and the recesses of each side being combined with the recesses, respectively the bosses of the opposite side of the neighbouring sheet in order to form between the successive sheets a multitude of little spherical lenses, thin, shining flat sheets of cellulose acetate being inserted between each group of four embossed sheets, a thin flat sheet being placed on the back of the screen, a non-shining cotton voile being placed on the front face of the screen and non-shining cotton nets inserted between certain of the embossed sheets.

12. A screen for cinematographic projections comprising a plurality of superposed sheets of cellulose acetate, both sides of each sheet having a multitude of bosses and recesses of semi-spherical shape, the bosses and the recesses of each side being formed from one side to the other of each sheet, and from one side of each sheet to the opposite side of the neighbouring sheet so that there is formed in the thickness itself of the transparent sheets, and in the spaces between the successive sheets, spherical lenses, thin, shining flat sheets of cellulose acetate being inserted between each group of four embossed sheets, a thin flat sheet being placed on the back of the screen, a non-shining cotton net being placed on the front face of the screen and non-shining cotton nets inserted between certain of the embossed sheets.

LEOPOLD DARIMONT.